United States Patent
Hall et al.

(10) Patent No.: US 10,950,076 B1
(45) Date of Patent: Mar. 16, 2021

(54) GARAGE ACCESS UNIT

(71) Applicant: Hall Labs LLC, Provo, UT (US)

(72) Inventors: David R Hall, Provo, UT (US);
Jerome Miles, Spanish Fork, UT (US);
Chris Jones, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 16/805,766

(22) Filed: Feb. 29, 2020

(51) Int. Cl.
| | |
|---|---|
| *G07C 9/00* | (2020.01) |
| *G03B 17/56* | (2021.01) |
| *E05F 15/77* | (2015.01) |
| *E05F 15/668* | (2015.01) |
| *E05F 15/73* | (2015.01) |

(52) U.S. Cl.
CPC .......... *G07C 9/00896* (2013.01); *E05F 15/77* (2015.01); *G03B 17/561* (2013.01); *E05F 15/668* (2015.01); *E05F 2015/767* (2015.01); *E05Y 2900/106* (2013.01); *G07C 2009/00769* (2013.01); *G07C 2009/00928* (2013.01)

(58) Field of Classification Search
None
See application file for complete search history.

(56) References Cited

U.S. PATENT DOCUMENTS

| | | | | |
|---|---|---|---|---|
| 8,694,792 | B2 * | 4/2014 | Whillock | G07C 9/37 |
| | | | | 713/186 |
| 9,922,513 | B1 * | 3/2018 | Hall | G08B 13/196 |
| 10,643,412 | B1 * | 5/2020 | Yang | H04N 7/186 |
| 10,657,383 | B1 * | 5/2020 | Solh | H04L 67/24 |
| 10,846,960 | B1 * | 11/2020 | Lemberger | G07C 9/00896 |
| 2009/0231441 | A1 * | 9/2009 | Walker | H04N 5/23229 |
| | | | | 348/207.1 |
| 2013/0170696 | A1 * | 7/2013 | Zhu | G06K 9/68 |
| | | | | 382/103 |

* cited by examiner

*Primary Examiner* — Carlos Garcia

(57) ABSTRACT

Methods for identifying objects arriving at a house are disclosed. The method includes identifying background objects visible in a field of view of a camera positioned at the house, labeling the background objects as permanent objects, monitoring the zone for new objects entering the zone, and classifying the new objects as vehicle, human, or animal. If the new object is not classifiable, the method includes issuing an alarm to a remote device. If the new object is classifiable, incrementing a count for the classification vehicle, human, or animal. If the count exceeds a limit, the method includes issuing an alarm. The method also includes receiving information for a predefined list of allowed entities containing visual characteristics for the allowed entities and recognizing the new object as an allowed entity.

20 Claims, 7 Drawing Sheets

GARAGE ACCESS UNIT

TECHNICAL FIELD

The present disclosure is directed to the field of garage door access systems.

BACKGROUND

Access to a garage via an access unit near the garage door has conventionally been done using a ten-digit keypad hardwired to the garage door opener. Entering the code opens the door. The security level for such systems leaves much to be desired and is incapable of allowing people access who do not know or cannot enter the code due to a disability or being too young to understand and remember the code, and to reach the keypad. Furthermore, once a person enters the garage, they have free reign and can get into and steal anything they can carry away. There is a need in the art for an improved garage access and security system.

SUMMARY

Embodiments of the present disclosure are directed to a garage access unit including a housing mounted to a wall of a house, a camera mounted in the housing and being directed toward a zone to be monitored by the camera, and a data storage unit in the housing being configured to store data captured by the camera. The garage access unit also includes a processing unit in the housing configured to execute commands to control the camera and the data storage component, and a wireless communication module configured to communicate with a remote device and to communicate with a motor unit coupled to an overhead door of a garage of the house. An open button mounted to the housing causes the wireless communication module to instruct the motor unit to raise, lower, or stop the overhead door. The garage access unit also includes a power supply configured to provide electrical power to the garage access unit. The commands include observing the zone with the camera, identifying objects visible in the zone as permanent objects, identifying a new object entering the zone that is not a permanent object, and classifying the new object as one or more of a vehicle, a human, or an animal. If the new object cannot be classified as a vehicle, a human, or an animal, the commands includes triggering an alarm. If the object is classified as a vehicle, human, or animal, the commands include incrementing a count for the vehicle, human, or animal accordingly, and if the count for the new object exceeds a predefined limit, triggering an alarm.

Further embodiments of the present disclosure are directed to a garage access unit wherein in response to identifying a new object the garage access unit can unlock the overhead door, activate the open button, open the overhead door, display a message, play an audible sound, or send a message to a remote device.

In other embodiments the present disclosure is directed to a method of identifying objects arriving at a house. The method includes identifying background objects visible in a field of view of a camera positioned at the house, labeling the background objects as permanent objects, monitoring the zone for new objects entering the zone, and classifying the new objects as vehicle, human, or animal. If the new object is not classifiable, the method includes issuing an alarm to a remote device. If the new object is classifiable, incrementing a count for the classification vehicle, human, or animal. If the count exceeds a limit, the method includes issuing an alarm. The method also includes receiving information for a predefined list of allowed entities containing visual characteristics for the allowed entities and recognizing the new object as an allowed entity.

Other embodiments of the present disclosure are directed to a garage access unit including an inside component mounted to a wall inside a garage near an opening for an overhead door including a housing, an inside camera mounted to the housing with a field of view directed toward the opening for the overhead door and including at least a portion of an inside of the garage, and an activatable open button mounted to the housing that is coupled to a motor unit for the overhead door. Pressing the activatable open button causes the motor unit to raise, lower, or stop the overhead door. The garage access unit also includes an outside component mounted to a wall outside the garage near the opening for the overhead door, including a housing, and an outside camera mounted to the housing with a field of view directed toward the opening for the overhead door and including at least a portion of a driveway leading up to the opening for the overhead door. A field of view of the inside camera and the field of view of the outside camera overlap in the opening for the overhead door. The garage access unit also includes an activatable open button mounted to the housing coupled to the motor unit for the overhead door. Pressing the activatable open button causes the motor unit to raise, lower, or stop the overhead door. The garage access unit also includes an electronics unit comprising a processing unit, a data storage unit, a battery, and a memory. The electronics unit is in the housing of the inside component, the outside component, or the electronics unit is split between the inside component and the outside component. The memory electronics unit is configured to execute commands stored in the memory. The commands include storing visually recognizable information for identifying one or more allowed entities, from visual images captured by the inside camera or the outside camera, recognizing an object entering a field of view of the inside camera or the outside camera as an allowed entity, and storing one or more rules associated with the allowed entities. The rules pertain to actions to be performed by the garage access unit. The commands also include executing one or more of the rules for an allowed entity when the camera identifies the allowed entity entering a field of view of the inside camera or the outside camera.

Still other embodiments of the present disclosure are directed to a method of monitoring items in a garage including observing with a camera a zone in a garage, storing information defining areas within the zone, storing item descriptions sufficient for the camera to identify, and storing a link between items and areas in the zone. The method also includes storing rules for detection of presence, absence, and misalignment of an individual item relative to the area pertaining to the individual item. If one or more rules is triggered by the presence, absence, or misalignment of the individual item relative to the area pertaining to the individual item, the method includes issuing an alarm to a remote device. The camera is mounted to a garage monitoring unit, and storing the information defining the areas, the item descriptions, and the rules for detection of presence, absence, or misalignment of the items is done on the garage monitoring unit.

Yet other embodiments of the present disclosure are directed to a garage monitoring unit including a camera, a memory configured to store instructions, a processing unit configured to execute the instructions stored in the memory, and a power supply configured to provide power to the camera, the memory, and the processing unit. The camera, memory, processing unit, and power supply are enclosed in a housing mounted to an interior wall or ceiling of a garage. The garage monitoring unit is configured to receive a definition of an area in a field of view of the camera in at least two-dimensional space in terms of coordinates, and receive a description of an item that pertains to the area. The description is sufficient for the camera to recognize the item when at least a portion of the item is in the field of view of the camera. The garage monitoring unit is further configured to monitor the area for the presence, absence, and misalignment of the item relative to the area, and store rules governing issuance of an alarm when the rules are triggered. The rules can contain a tolerance in terms of misalignment and schedule. The garage monitoring unit is further configured to deliver an alarm if one or more of the rules is triggered.

Other embodiments of the present disclosure are directed to a method for monitoring items in a garage, including providing a definition of an area in the garage to a garage monitoring unit mounted in the garage. The garage monitoring unit comprises a camera positioned to observe the area in the garage. The method also includes identifying an item pertaining to the area such that the camera of the garage monitoring unit is capable of identifying presence, absence, and misalignment of the item relative to the area, and inputting a rule for issuing an alert if the presence, absence, or misalignment of the item relative to the area breaks the rule. The method also includes receiving an alert from the garage monitoring unit when the rule is broken.

Still further embodiments of the present disclosure are directed to a package delivery placement system including a garage access unit having a projector configured to display a landing zone onto a surface of a garage or a driveway, a processing unit configured to execute commands to control the projector, and a memory configured to store instructions for the processing unit to execute. The garage access unit also has a camera configured to observe the garage or driveway. The garage access unit receives package information comprising a package identifier and a size of the package, and receives coordinates defining a landing zone pertaining to a package identified by the package identifier. The landing zone is approximately the size of the package. The garage access unit also projects a visual indication of the landing zone.

Further embodiments of the present disclosure are directed to a method of receiving a package in a landing zone relative to a structure. The method includes receiving package information for a package to be delivered to the structure including a size of the package, defining a landing zone for the package according to the size of the package, and receiving notice that the package has arrived at the structure. In response to the notice, the method includes displaying a visual display of the landing zone, monitoring the landing zone to confirm the package is in the landing zone, and issuing a notification that the package is in the landing zone.

Embodiments of the present disclosure are directed to a garage access and package delivery placement projector. The system includes a housing mounted to a wall in a garage, a camera mounted to the housing with a field of view including a garage floor to be used as a landing zone for packages to be placed, and a projector held by the housing configured to emit a visible light defining a landing zone in the garage. The system also includes a processing unit in the housing, and a memory configured to store instructions for operating the projector and camera. The instructions include a definition of a landing zone for a particular package according to the size of the package. The projector is configured to emit the visible light onto the landing zone. The instructions also include an instruction that the particular package has arrived, and an instruction to display emit the visible light to define the landing zone. Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "man door" is meant to refer to a conventional door as opposed to an overhead door. "Overhead door" refers to a vertically retractable door such as a garage door. Some overhead doors are rolled around a shaft, others have hinged panels that are in a horizontal orientation when the overhead door is retracted. Some overhead doors are moved by a motor mounted to a shaft that rotates the shaft to raise and lower the overhead door. Other overhead doors are directly connected to the motor and the motor raises and lowers the doors directly. "Garage access unit" is a unit capable of providing access to a garage such as by unlocking or opening an overhead door, or by sending an appropriate message to a remote device to alert an individual or other machine to provide or decline access to the garage. "Garage monitoring unit" can be interchangeable with garage access unit and refers to a unit that can provide monitoring of a garage and surrounding areas. "Camera" can include any device sensitive to light in any spectrum, and is not limited to photographic cameras, lasers, or any portion of the visible or invisible spectrum.

Figure 1:
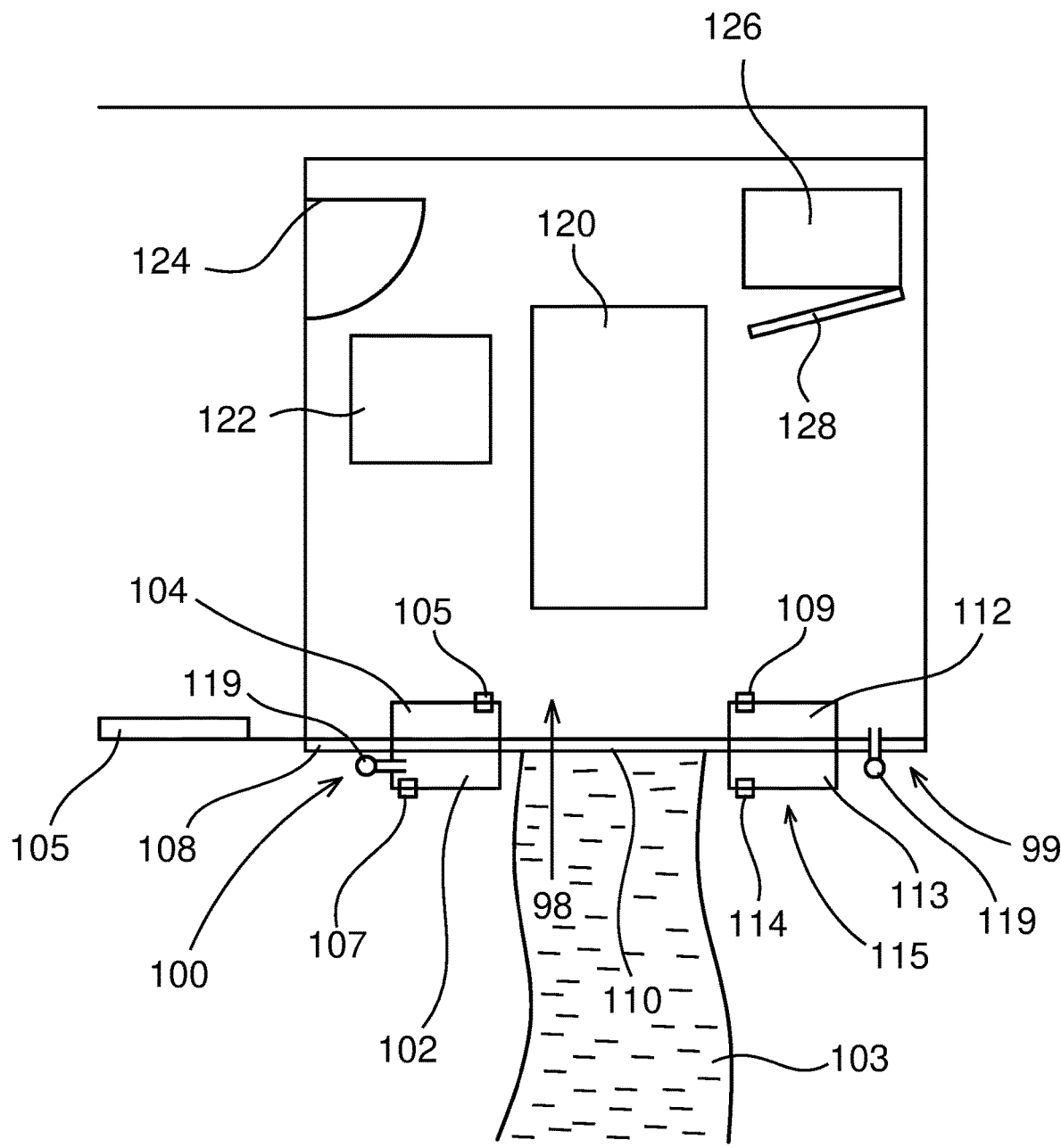
FIG. 1 is a partial overhead blueprint view of a garage of a house and a garage access unit according to embodiments of the present disclosure.

FIG. 1 is a partial overhead blueprint view of a garage 98 of a house 99 and a garage access unit 100 according to embodiments of the present disclosure. The house 99 can have a driveway 103 and a front door 105. The garage 98 can have an overhead door 110 that raises and lowers to grant access to the garage 98 as is known in the art. The overhead door 110 can be a rollup door, a hinged-panel door, or any other suitable garage door that opens and closes under the power of some type of a motor or under manual operation.

The garage access unit 100 can have an outside component 102 and an inside component 104. The outside component 102 can have a camera 107, and the inside component 104 can have a camera 105. In some embodiments the garage access unit 100 is embedded into a wall 108 of the house 99 with the outside component 102 on the outside and the inside component 104 on the inside. In some embodiments the inside and outside components are a single unit accessible from the inside and outside. In other embodiments the outside unit 102 houses electronics for the unit 100 and the inside component 104 comprises the camera 105 only. In other embodiments the inside unit 104 houses electronics for the unit 100 and the outside component comprises the camera 107 only. The outside component 102 and inside component 104 can be connected by a wire that extends around the edge of the wall 108 through the garage door opening, or by a wire through a hole in the wall 108. In other embodiments the inside component 104 and outside component 102 are wirelessly connected via Bluetooth or Wi-Fi or another type of short-range signal.

The cameras 105, 107 may be separate from the garage access unit 100 and there may be multiple cameras operating together to provide the visual input for the garage access unit 100. There may also be microphones 119 associated with the garage access unit 100 that may be integral to the garage access unit 100, with the inside component 104, or with the outside component 102, or they may be stand-alone units that coordinate and communicate with the garage access unit 100 via a hardline or a wireless connection.

In some embodiments there can be a secondary unit 115 that operates in concert with the primary unit. The secondary unit 115 may have a secondary inside component 112, secondary camera 109, secondary outside unit 113, and secondary camera 111. The secondary unit 115 can include between any of these components in any combination.

The garage access unit 100 can be a self-contained unit that operates without the need for a constant internet connection or power supply. The garage access unit 100 can be connected to the internet and to power at an outlet, but there is also sufficient local power in a battery or through solar or other self-sufficient power means, and processing power onboard, and data storage (hard drive, SSD, NVME drive, etc.) so that the garage access unit 100 can operate in isolation and is not dependent on power or data connections.

The inside camera 105 (or cameras if there are additional inside cameras) can observe the interior of the garage 98 and monitor the status and position of items in the garage 98, such as a car 120, an ATV 122, a freezer 126, a door 124, or other components inside the garage. The operation of the inside camera 105 is described in greater detail below.

The outside camera 107 can be directed outwardly from the house 99 and configured to view a zone in front of the house 99, to the side of the house 99, above the house 99, or any other desired field of view of the camera 107. The camera 107 can be used to monitor the environment near the house 99 in the zone to give the homeowner information regarding things observed around the house 99. The garage access unit 100 is equipped with communication means such as Bluetooth or Wi-Fi or by accessing the data storage (drives, etc.) by which the garage access unit 100 can provide information about the happenings around the house 99. The unit can notify the homeowner of certain things and can be programmed to give alerts that are useful and desired, and not mundane and overly frequent.

Figure 2:
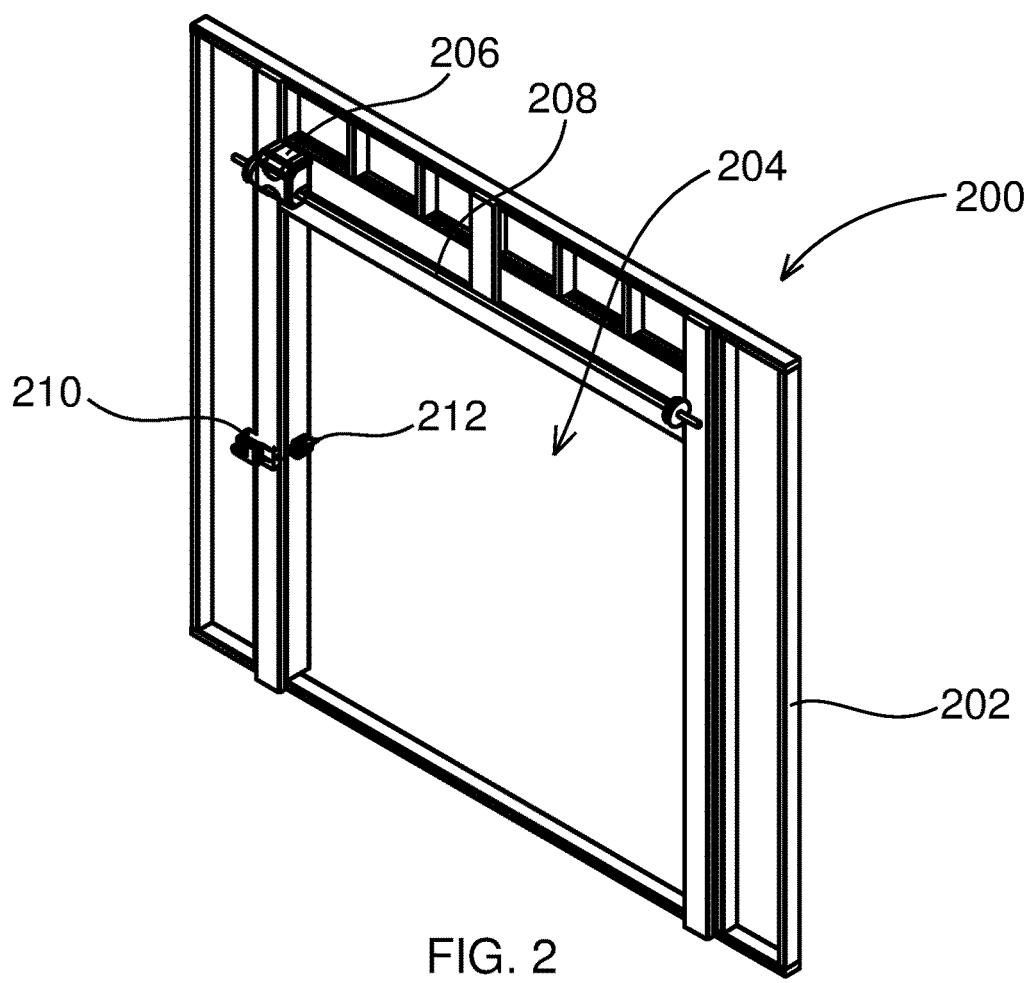
FIG. 2 is a perspective view of a garage access unit and a garage door frame according to embodiments of the present disclosure.

FIG. 2 is a perspective view of a garage access unit 200 and a garage door frame 202 according to embodiments of the present disclosure. The frame 202 can be a single-car or multi-car garage and defines a garage door opening 204 shown here with no overhead door installed to avoid obscuring aspects of the present disclosure. A motor unit 206 is positioned above the garage door opening 204 and is coupled to a shaft 208 that is rotated by the motor unit 206 to raise and lower the overhead door. The motor unit 206 is in communication with the garage access unit 200 and responds to commands to raise, lower, or stop the overhead door.

The garage access unit 200 can include an inside component 210 and an outside component 212. The outside component 212 can be positioned on a side-facing portion of the frame 202 for convenience. In other embodiments the outside component 212 can be placed on a front-facing wall. The inside component 212 can be placed inside the garage on a portion of the frame 202 that may be close to the outside component 212. The inside and outside components together can be the garage access unit 200. In other embodiments the garage access unit comprises only one of these components. In still other embodiments one of the inside component 210 and outside component 212 can be a camera and button, while the other contains electronics such as a processing unit, data storage means, memory, wireless communication modules, and a power supply such as a battery. The inside component 210 can be connected to the outside component via a hardline or over a wireless communication protocol such as Bluetooth or Wi-Fi. The garage access unit 200 can also be connected to the motor unit 206 via hardline or wireless communication protocols.

Figure 3:
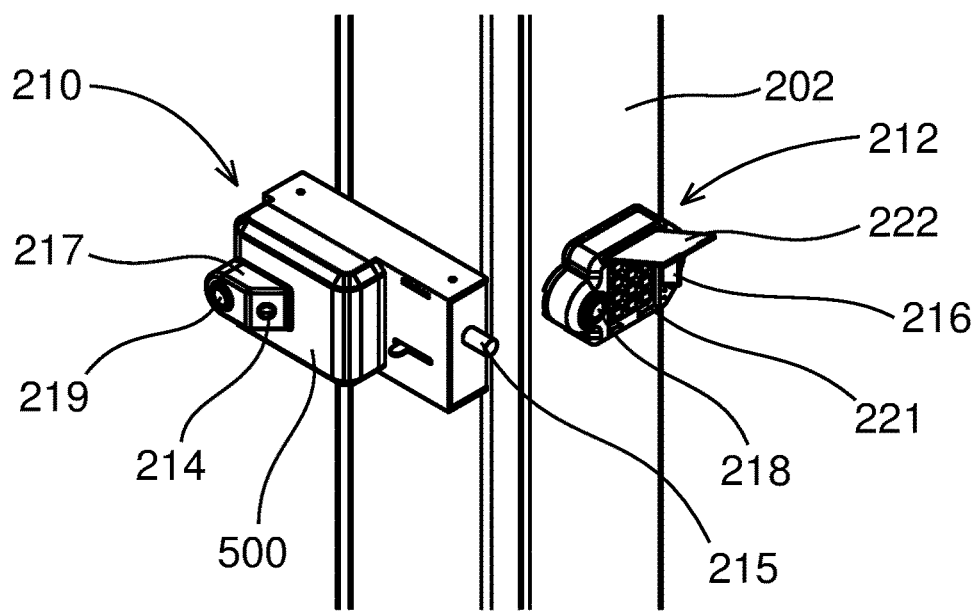
FIG. 3 is a close-up view of the garage access unit according to embodiments of the present disclosure.

FIG. 3 is a close-up view of the garage access unit 200 according to embodiments of the present disclosure. The inside component 210 can include a deadbolt 215 configured to extend or retract into a recess in the overhead door (not shown). An inside camera 214 is mounted to the inside component 210 and is positioned to have a clear view of the inside of the garage. In the embodiment shown the inside camera 214 is on an angled support 217 oriented at approximately a 45-degree angle to allow the camera 214 to have a field of view including substantially the entire plane of the overhead door, and well into the garage itself. The camera 214 can be a wide-angle camera having a 180 degree field of view from left to right as well as vertically from the floor to the ceiling. The inside component 210 also has a button 219 that can be pressed to instruct the motor unit to raise, lower, or stop the overhead door.

The outside component 212 can also include a camera 216 that can be generally similar to the inside camera 214. It can also be placed on an angled support shown to greater advantage in FIG. 4. A button 218 is on the outside component 212 and an alphanumeric keypad 221. The outside component 212 can also include a cover 222 to hide and protect the keypad 221.

Figure 4:
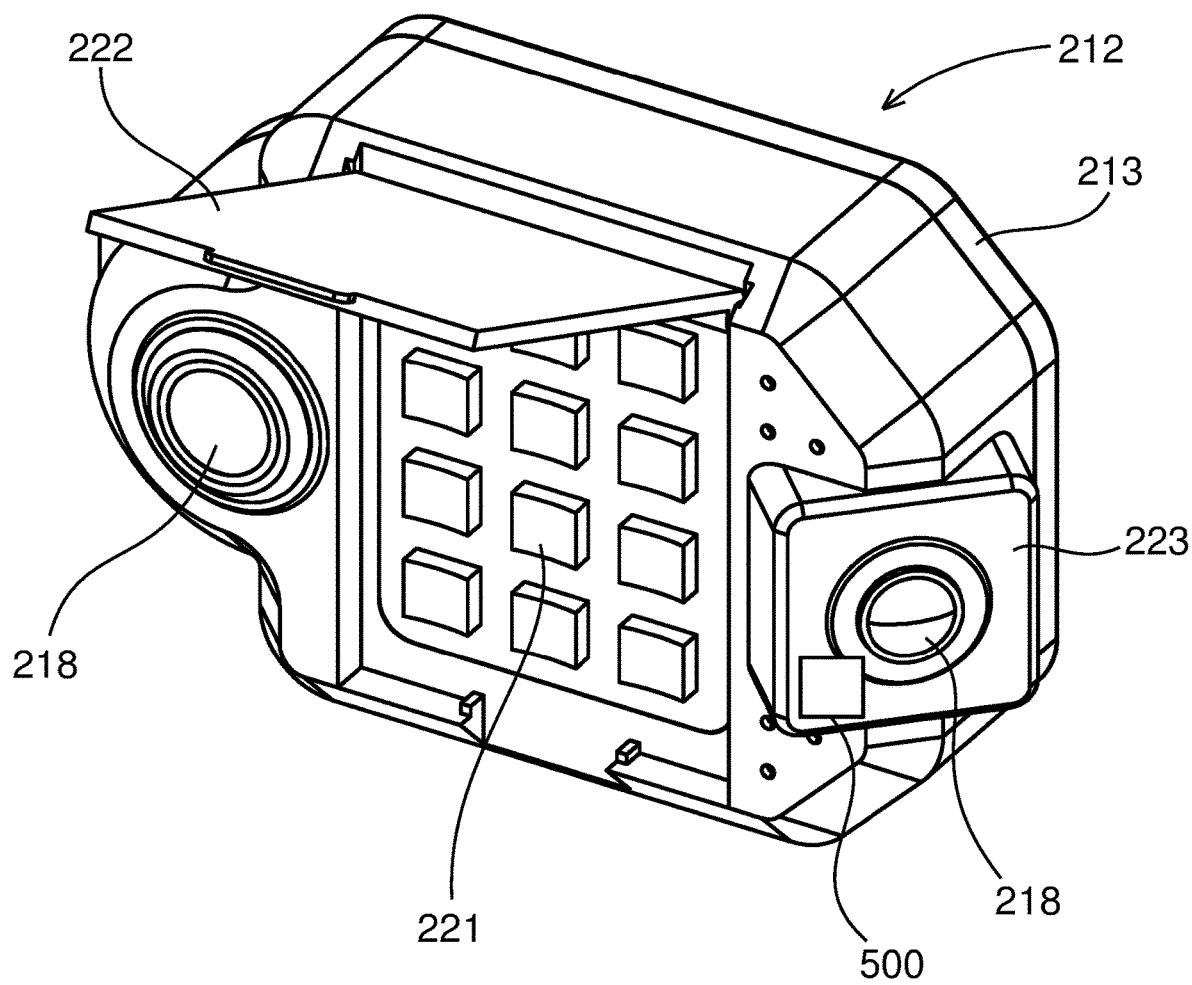
FIG. 4 is a perspective view of the outside component according to embodiments of the present disclosure.

FIG. 4 is a perspective view of the outside component 212 according to embodiments of the present disclosure. The outside component 212 can include a housing 213, a button 218, a cover 222, an alphanumeric keypad 221, and an angled support 223. The angled support 223 is positioned at a 45-degree angle, halfway between the plane of the overhead door and the side of the frame upon which the outside component 212 is mounted. In other embodiments the angled support 223 can be on a swivel such as a gimbal and can be adjusted left, right, up, or down. In other embodiments there may be a motorized actuator coupled to the gimbal that can move the camera 218 up, down, left, and right. The motorized actuator can be controlled remotely at a computer or mobile device.

Figure 5:
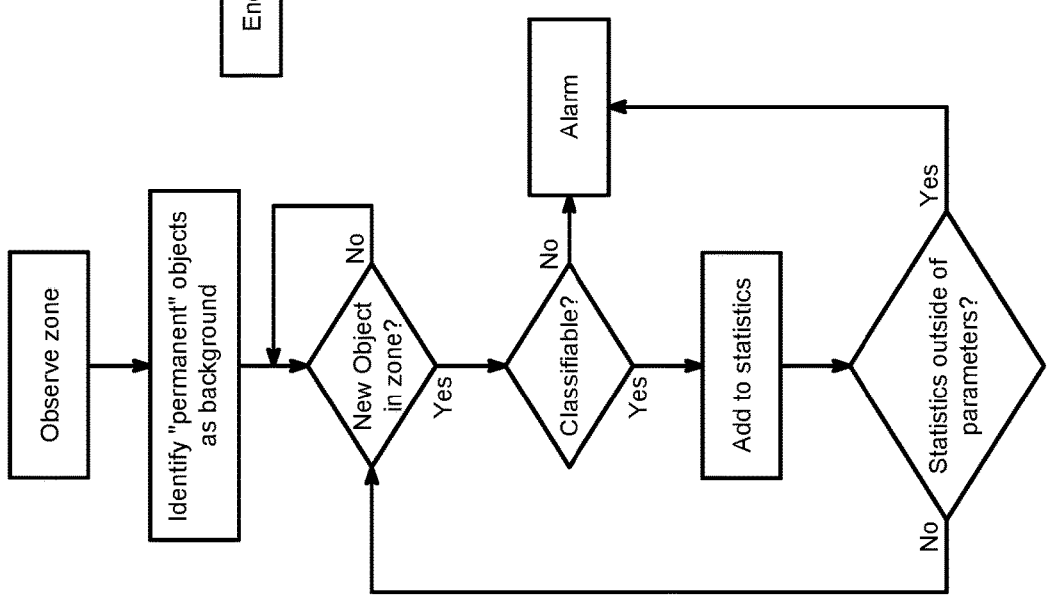
FIG. 5 is a block diagram of a method of operating the garage access unit and the outside camera of the garage access unit according to embodiments of the present disclosure.

FIG. 5 is a block diagram of a method 340 of operating the garage access unit 100 and the outside camera of the garage access unit according to embodiments of the present disclosure. Various actions are described herein that may be executed by a CPU on the garage access unit or they may be executed by a remote CPU connected to the garage access unit. Without limiting the scope of the present disclosure and for the sake of conciseness, the actions are described herein as being performed by a "unit" which refers to the garage access unit 100 shown in FIGS. 1-4. The garage access unit 100 may have an inside component, an outside component, or both inside and outside components.

At 342 the camera is positioned to observe the zone. A user may position the camera anywhere and thereby define the zone. The camera can continually or intermittently observe the zone as the method 340 is executed. At 344 the unit identifies "permanent" objects in the zone. The term permanent here refers to objects that are fixed, such as houses, streets, trees, etc. The unit identifies these items as background scenery for purposes of identifying a change to the environment. The word permanent is not to be interpreted in its strict sense of absolute immutability. The permanent objects in the background can be used to identify when a new object enters the zone. At 346 a check is performed for such a new object. An example can be a delivery by a carrier such as a UPS (TM) delivery truck arriving at the house in the zone in front of the camera.

A successful check at 346 results in moving to the next check at 348 to identify whether or not the new item is classifiable. A UPS truck is classifiable into one or more categories. The categories of classification can be in levels of specificity. For example, the categories in increasing specificity order may be: 1. inorganic, moving object; 2. vehicle; 3. delivery vehicle; 4. UPS delivery vehicle; 5. license plate number. The most common objects to appear in a zone in front of a house are vehicles, people, and animals. These objects can each be subject to classification schemes that can be predefined and loaded onto software run by the garage access unit, or they can be defined by the user at any time.

At 350 if the object cannot be classified, an alarm is triggered. If the object is classifiable, at 352 the occurrence is added to a list of statistics describing what went on at the house that day. For a given day the unit may create a log including a number of vehicles that drove by the house, how many stopped at the house, how many of them were cars or trucks, how many people walked by, how many animals, etc. Also, a length of time of a visit can be logged.

A user can set parameters that dictate when an alert is delivered to the user's phone or email or other communication device. At 354 the parameters can be checked and if they are outside of a defined range, an alarm at 350 can be given. If not, the camera continues monitoring at 346. The parameters can be for any desired item classified by the unit. As an example, consider a length of time parameter. If a person walks up to the front door in the zone, rings the doorbell, then leaves after one minute, no alarm is given. If the same person walks up to the same front door at the same time of day, but stays for thirty minutes, an alarm can be given.

Figure 6:
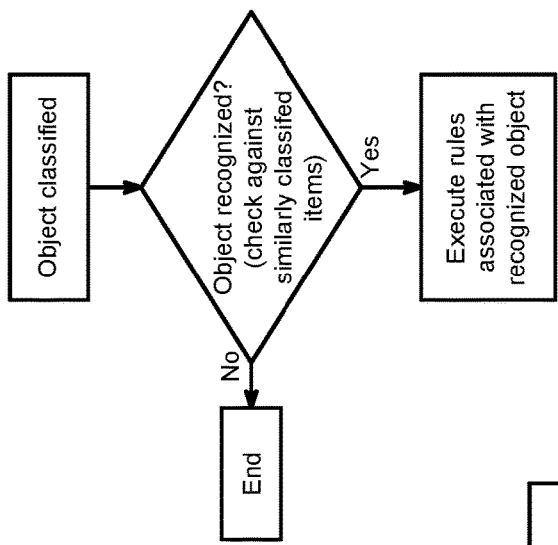
FIG. 6 is a block diagram of a method for classifying objects according to embodiments of the present disclosure.

FIG. 6 is a block diagram of a method 360 for classifying objects according to embodiments of the present disclosure. At 362 the object is classified. At 364 once the object is classified, a check is performed for whether or not the object is recognized. Certain vehicles, people, and animals can be predefined to the unit as being recognized items. For example, the unit can identify an object as a person and classified as a person, but family members can further be recognized. If the object is not recognized at 366 the method 360 can end or can proceed to 352 in FIG. 5. If the object is recognized, the unit can store rules associated with each recognized item. At 368 the rules can be accessed and executed. For example, a child in the family living at the house can walk up to the garage access unit which identifies the child as a person, then recognizes facial features or other distinguishing characteristics such as a wheelchair or a certain pair of shoes or any other feature that, when taken together as a whole, provides sufficient confidence for the unit to recognize the person. Specifics of how a face is recognized are given in U.S. Pat. No. 6,292,575, which is incorporated herein in its entirety. The rules for the garage access unit for this child may be to open the overhead door to the garage when she approaches. Or, a button that when pressed will open the overhead door is activated when she approaches. These rules can be defined by the user and changed at any time via a user interface connected to the garage access unit. In another example, a vehicle can be the item entering the zone. If the vehicle is known to the unit as residing in the garage, the unit can identify that the vehicle has arrived and can execute a rule such as opening the overhead door. If the vehicle is customarily parked on the driveway, the rules can be different.

Figure 7:
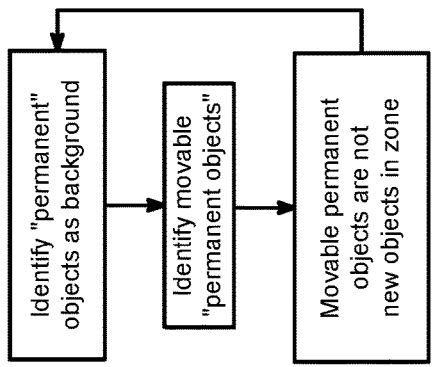
FIG. 7 is another block diagram of a method for distinguishing between static and dynamic permanent objects according to embodiments of the present disclosure.

FIG. 7 is another block diagram of a method 370 for distinguishing between static and dynamic permanent objects according to embodiments of the present disclosure. The method 370 can be executed in conjunction with the method 340 shown in FIG. 2, specifically at 344 as objects are identified as "permanent." At 372 the zone is viewed and objects are parsed and identified as being permanent and therefore background for purposes of identifying the presence of a new object in the zone. Certain objects, such as trees, however, are permanent but moving. Wind can cause movement of these "permanent" items and accordingly the unit can recognize these items as being part of the background despite occasional movement. At 376 the movable "permanent" objects are not labeled as new in the zone.

In some embodiments a degree of movement below a defined threshold can be considered background movement, but if the movement exceeds expected parameters, the object can be identified as a dynamic, new object. For example, wind moves trees to some degree, but if a tornado is in the area the trees will move by more than an expected amount in which case the event is definitely worth noting and so the tree is no longer merely background, but rather can be reclassified as a new, dynamic item the methods of FIG. 2 can be applied to classify and possibly recognize the item. Another example can be a fire or demolition of a house across the street that is visible in the zone. Such drastic changes can be noticed by the unit and reported as important.

Figure 8:
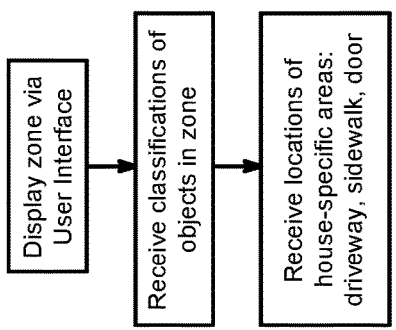
FIG. 8 is another block diagram of a method for establishing classification of objects according to the present disclosure.

FIG. 8 is another block diagram of a method 380 for establishing classification of objects according to the present disclosure. At 380 a user interface can display to a user the zone. At 384 the unit can receive an indication from the user of what is in the zone. For example, the user can use a mouse or a touch screen interface to identify which items are houses, which are cars, which are trees, etc. At 386 the unit can receive house-specific areas such as where the driveway is, where the front door is, etc. The user may wish to ignore certain vehicles that are in the zone, such as a neighbor's car that frequently comes and goes from the zone. A user may be interested in these movements, or they may not be. The unit can use these house-specific items to more accurately identify and classify delivery vehicles and personnel and distinguish from joggers or others walking by the house.

Figure 9:
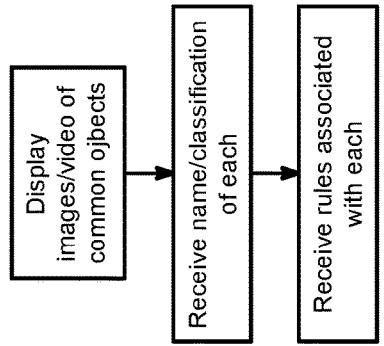
FIG. 9 is another block diagram of a method for inputting rules to the unit according to embodiments of the present disclosure.

FIG. 9 is another block diagram of a method 390 for inputting rules to the unit according to embodiments of the present disclosure. At 392 a user interface can display images or video/audio pertaining to objects observed in the zone. This process can be repeated from time to time if a sufficient number of new objects have entered the zone. The unit at 394 can receive a name and/or classification of the object that the unit can use for later classification and/or recognition. At 396 the unit can receive an input of rules to be executed in response to the object entering the zone the next time. In a working example, suppose a family has hired a new babysitter who arrives in her mother's car. The car is one that has never been in the driveway before. The unit can query the user about the car and display an image or video of the car. The user can input instructions that this car is for the babysitter, and that the overhead door to the garage is to be opened when this car arrives, and a text message is to be sent to the user's phone saying "The baby sitter is here! Have fun on your date!" The next time the car arrives, it will be identified as a dynamic object not belonging to the background, it will be classified as a car, and recognized as the babysitter's mother's car. The overhead door to the garage is opened for her to enter, and the text message can be sent.

Referring briefly back to FIG. 1, areas can be defined as portions of a zone in which certain items are designated to be in the garage or on a driveway according to embodiments of the present disclosure. For example, a car can be designated for area 120, an ATV for area 22, a freezer at area 128, and a door into the house can be at area 124. Any number of areas within the zone can be defined, and the examples given here are not limiting but are to help describe the methods and systems of the present disclosure.

Figure 10:
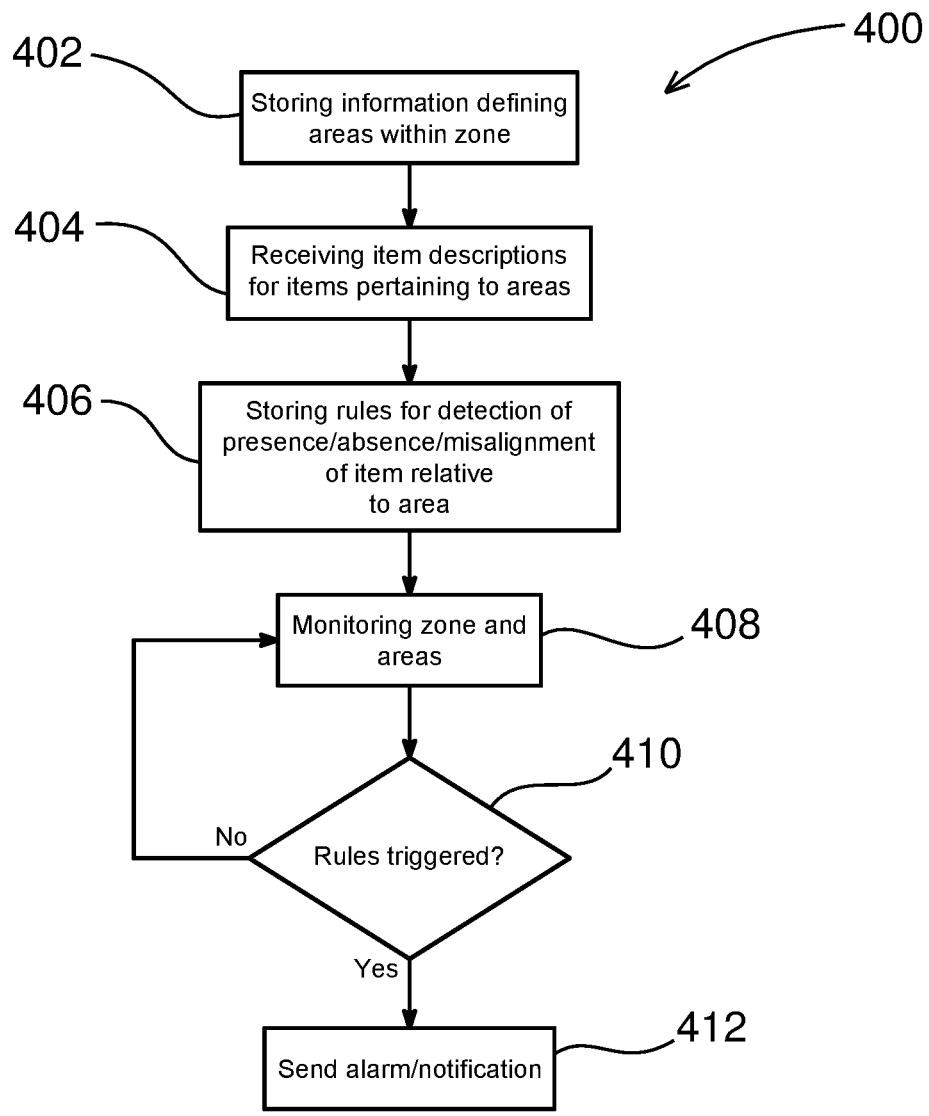
FIG. 10 is another block diagram showing a method for use with a garage monitoring unit and defined areas according to the present disclosure.

FIG. 10 is another block diagram showing a method 400 for use with a garage monitoring unit and defined areas according to the present disclosure. The garage monitoring unit can be similarly equipped as the garage access unit that is described elsewhere herein, including some or all of the components such as an inside component, outside component, cameras, processing power, data storage, and power supply. The method 400 can be executed by the garage monitoring unit using an inside component or an outside component, or both an inside component and an outside component working together. At 402 the garage monitoring unit stores information defining areas within the zone. The areas can be input to the garage monitoring unit using a user interface on a mobile telephone, a laptop, or a desktop computer or another suitable interface. The garage monitoring unit can display the zone and the user can designate the as many areas as desired. For purposes of explanation an example is given of a car at area 120, an ATV at area 122, a door at area 124, and a freezer at area 128. The user can set the boundaries for the areas and can name the areas.

In some embodiments a physical marker of the areas can be physically placed in the zone to define the areas. The physical marker can be a tape, a marker, paint, or an RFID tag or other electronic component that is placed in the zone to define the areas. The physical marker can have an optically distinctive characteristic, such as reflecting a certain spectrum of light that can be easily detected by the camera. In the case of a tape, the user can place tape down to mark where the car is to be parked at area 120. The camera and garage access unit can optically and automatically identify the tape and create the area accordingly.

At 404 the garage monitoring unit receives an item description for items that pertain to the areas. In the continuing example, the description of the car is given for the area 120 that pertains to the car. The same can be done for the ATV, door, and freezer, and for whatever other item is to be monitored by the garage monitoring unit. In some embodiments a physical marker can be used to identify the items for the zones. The physical marker can be an optically identifiable one, or an electronically recognizable one. Tape, paint, or other marker can be placed on the items, which can be invisible to the naked eye and only reflect or emit light in a non-visible range of the spectrum that can be easily identified by the camera of the garage access unit.

At 406 the garage monitoring unit can store rules for detecting the presence, absence, or misalignment of the items relative to the areas. The rules can be customized according to individual preferences regarding what to do in the case of the garage monitoring unit detecting the presence, absence, or misalignment of one or more objects. A rule for presence or absence can be used to determine whether or not valuable items are in the garage where they are intended to stay. The rules can be according to a schedule. For example, a car should be in its assigned area 120 during the night, but when the user gets in the car in the morning to drive to work, the car should be absent. The operation of the car (or other item) can be linked to the rule and how it is applied. For example, starting the car and driving to work can alter the rule to expect the area 120 to be empty, and if the area becomes occupied before the car has returned, the rule can be triggered and a notification can be sent. The same applied to other items and their respective areas. At 408 the areas can be continually or periodically monitored. At 410 if the rules are triggered, at 412 an alarm or notification is sent. If no rule has been triggered, monitoring continues at 408.

Misalignment of items with respect to their designated areas can be defined along with a tolerance for the misalignment. The tolerance for misalignment can be set by a user through a user interface or can be programmed initially. Misalignment of doors in their respective areas can be a useful feature to monitor. Consider the freezer in area 128. If the door to the freezer is not properly shut energy is wasted and food inside can spoil. The tolerance for the door's misalignment can be relatively small compared to a parking area for a car. If the camera notices the door is not properly shut it is misaligned and an alarm or notification can be delivered.

Determining the tolerances for misalignments can be done manually by positioning the item in the area at an acceptable limit in one direction, then in another. In the example of a car, the car can be moved forward as far as possible while the camera of the garage unit is viewing the area and item, and the user can indicate this is the forward-most position for the car. The same can be done with the rearward-most acceptable position, and for left and right. For an open freezer door, an acceptable position of closed can be input, and all other positions are unacceptable if maintained for more than a predefined time, or after the person leaves the garage, or after lights are turned off, etc.

An area can be defined for an overhead door that is raised, lowered, and stopped by a motor unit operating in concert with the garage monitoring component according to the present disclosure. An area can be defined by a user using a user interface relative to an area in which the overhead door will open and close. The rules and tolerances for movement of the overhead door can be different as the motor unit closes the overhead door to prevent injury or damage. The rules can be different for raising the overhead door than they are for lowering the overhead door. While the overhead door is being lowered, the area under the door and within a prescribed area around the door is monitored by the camera of the garage unit, and if anything enters the area, the motor unit can be instructed to stop the overhead door.

A similar situation can be employed while a car is backing out of the garage and through the driveway. While the car is reversing out of the garage and into the driveway, the camera can monitor for objects in the path of the car and can even be connected to the car to issue a command to stop the car if anything comes in the way of the car. The garage monitoring unit can be connected to a camera in the car such as a rear-view camera and can also be connected to the controls of the car and can cause the car to stop if a child or other item enters the field of view and is in danger. In embodiments of the present disclosure the cameras monitor the garage and the entire driveway.

Referring briefly back to FIGS. 3 and 4, the garage access unit can be equipped with a laser 500 that can illuminate areas in the zone. Referring also to FIG. 1, the laser 500 can be used to establish the areas, tolerances, and misalignments by providing feedback to the user which is helpful to define the areas. The laser 500 can be another type of illumination device, such as a bright light or another indicator.

Package delivery is becoming more and more the mainstay of commerce. Furthermore, methods for indicating a place for packages to be placed within a garage are disclosed in U.S. Patent Application Publication No. 20190003480 which is incorporated herein by reference.

Figure 11:
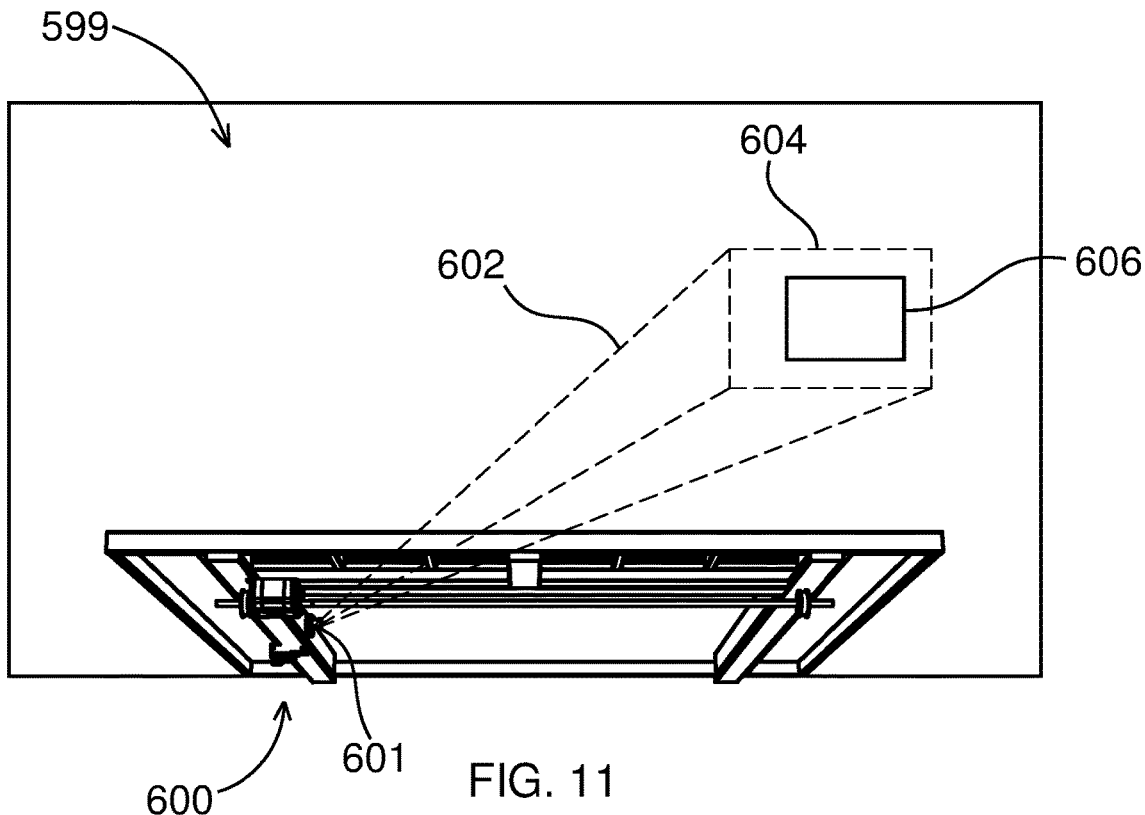
FIG. 11 is an overhead view of a garage using a garage access unit to assist with package delivery placement according to embodiments of the present disclosure.

FIG. 11 is an overhead view of a garage 599 using a garage access unit 600 to assist with package delivery placement according to embodiments of the present disclosure. The garage access unit 600 can have a projector 601 that illuminates a region of the garage 599 in which a delivered package is to be placed. The garage access unit 600 can be instructed where packages should be placed ahead of time using the projector and a user interface. When packages arrive, the garage access unit 600 is informed of the arrival via wireless communication means in the garage access unit and can project a light 602 onto a surface in the garage upon which the package 606 is to be placed. The garage access unit 600 can be informed of the size, shape, and weight of the package 606 ahead of time and can create an appropriate display of a landing zone 604 on the floor of the garage, on a shelf, or anywhere the package 606 is to be placed. The landing zone 604 can include a message such as "place package here" or a blinking light to draw attention. The delivery personnel can therefore easily identify where the package 606 is to be delivered. The desired area may be outside the garage, and the projector 601 can be on an outside unit or an inside unit or both inside and outside units. Systems and methods for allowing a garage door to open upon arrival of delivery personnel are disclosed in [SMT20006], and with this method the arrival of the package can also trigger the projector 601 to display the landing zone 604.

Figure 12:
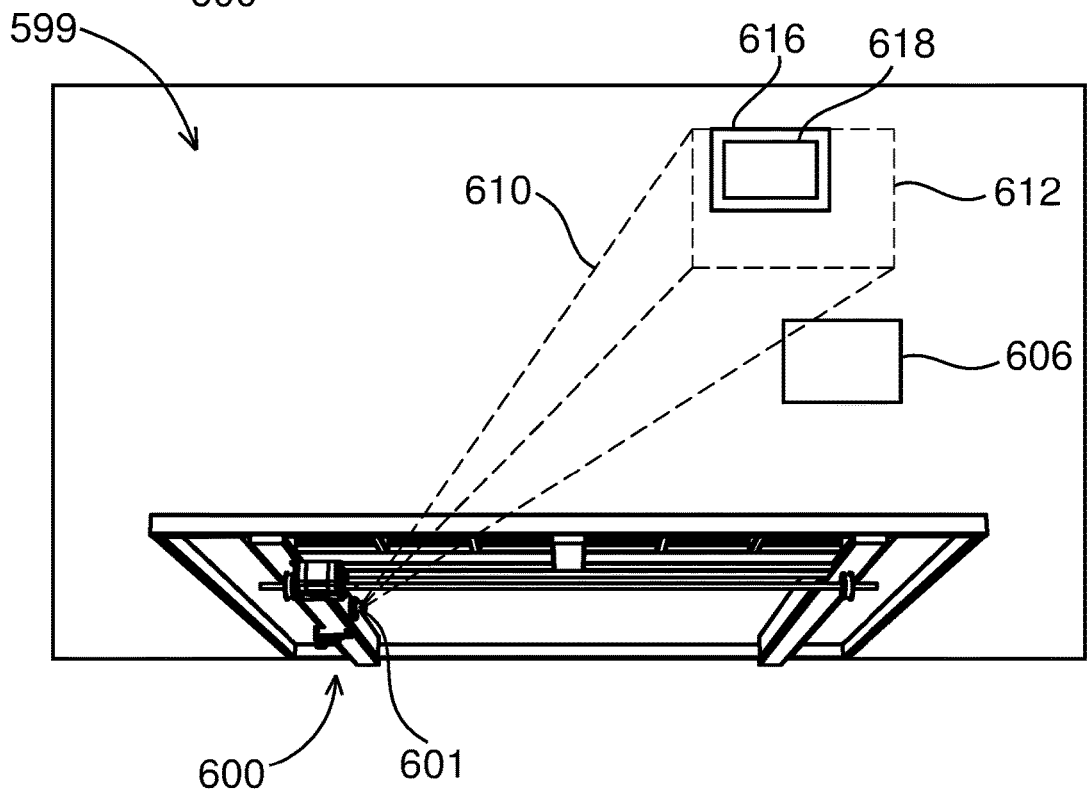
FIG. 12 shows the garage access unit of FIG. 11 when successive packages arrive according to embodiments of the present disclosure.

FIG. 12 shows the garage access unit 600 of FIG. 11 when successive packages arrive according to embodiments of the present disclosure. The package 606 has been successfully delivered to the location shown in FIG. 11 on the landing zone 604, and therefore the landing zone is no longer displayed. The next package to arrive may need to be delivered to a different landing zone. The garage access unit 600 emits light 610 to display another landing zone 612 in a different place for package 616. A third package 618 in this example is included with the second delivery, but the size and weight of the packages allow package 618 to be stacked on top of package 616. The landing zone 612 can make this instruction clear to the delivery personnel using a message displayed on the ground, and then on top of the package 616. In some embodiments an audio message can be played for the delivery personnel saying "please stack the packages here with package 616 on the bottom and package 618 on the top. After delivery is made the garage access unit 600 can confirm delivery and can send photographic evidence of the delivery to the user.

In the case of an unscheduled delivery, the garage access unit 600 can be configured to search for an available space on the garage floor for a landing zone. If the size and weight of the package is known, or that information can be conveyed to the unit 600, an accurate, weight-conscious area can be chosen. If not, the garage access unit 600 can make an estimate of size and can give a relatively large area to display.

Figure 13:
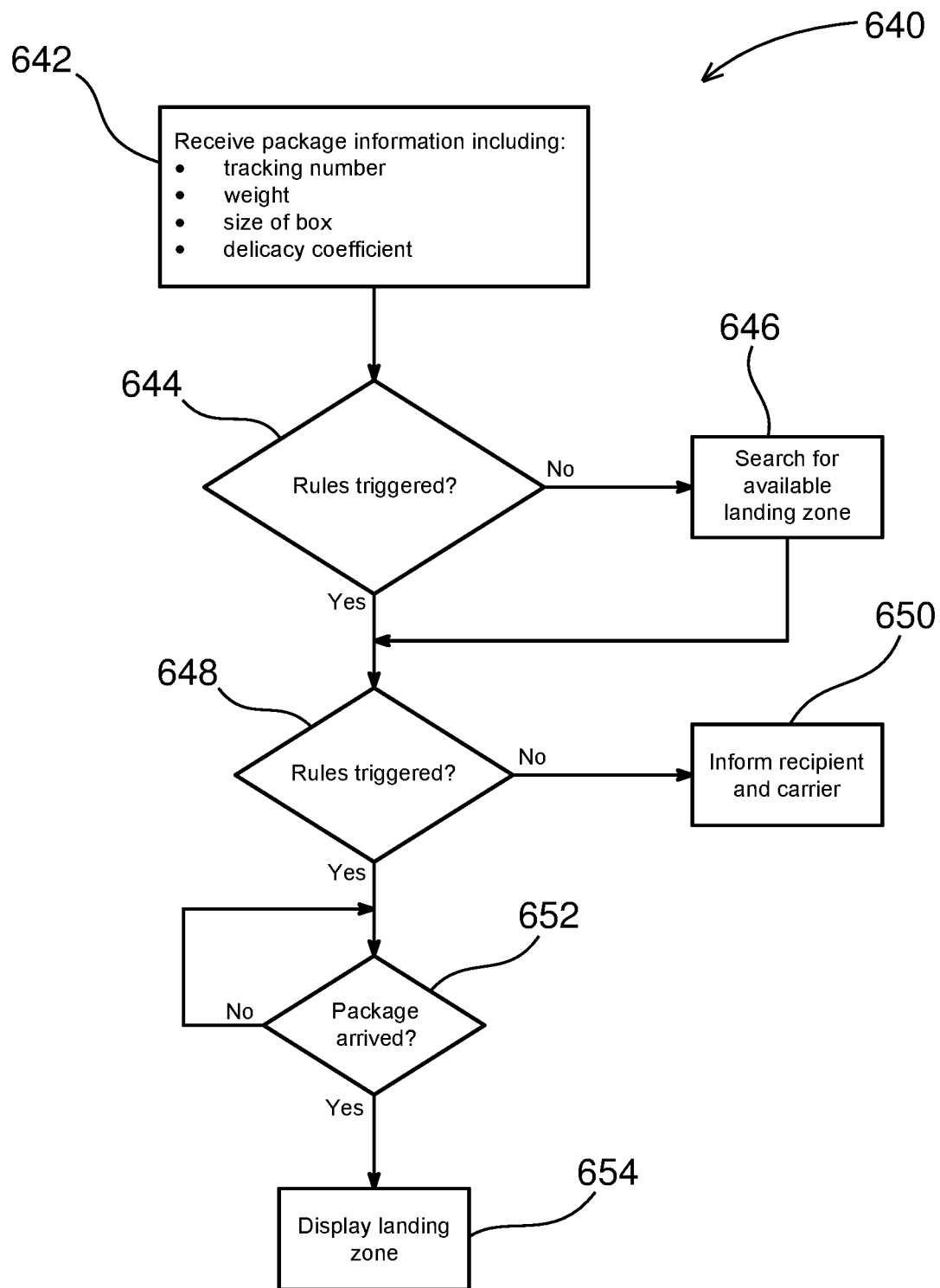
FIG. 13 is a block diagram of a method for use with the laser and garage access unit according to embodiments of the present disclosure.

FIG. 13 is a block diagram of a method 600 for use with the laser and garage access unit according to embodiments of the present disclosure. At 642 package information is received at the garage access unit. The package information can include any one or more of tracking number (or other identifier), weight, size of box, and a delicacy coefficient. The delicacy coefficient can be an arbitrary number given to packages to describe how likely and/or expensive damage is to occur. A multiplier of likelihood and cost of damage can be used to properly assign a delicacy coefficient. The delicacy coefficient can be used to decide whether or not the package can be stacked on top of or underneath another package. It can also be used to decide whether or not a high shelf is appropriate, considering the risk of a fall.

At 644 the garage access unit checks for whether or not a landing zone has been designated ahead of time by a user. If not, the garage access unit can at 646 search for available areas. This search can be executed using the cameras and other sensing devices associated with the garage unit as disclosed herein. At 648 once a landing zone has been identified either ahead of time or as a result of a search by the garage access unit, the landing zone can be checked for suitability. At 648 requirements for the landing zone can be judged. Size and shape of the package to be delivered can be easily compared to the landing zone. Delicacy coefficient can also be factored in to determine suitability of the landing zone. If the landing zone is unsuitable, at 650 the garage access unit can inform the user and/or the carrier of this fact. Other arrangements may be available, such as requiring the delivery personnel to hand-deliver the package to the house, or the delivery can be rescheduled for another time. The actions taken in response to an unsuitable landing zone can vary based on the delicacy coefficient as well.

If the landing zone is suitable according to the landing zone requirement and the package information, at 652 the garage access can monitor for the package's arrival. When it arrives, at 654 the garage access unit can display the landing zone.

The landing zone can be a series of landing zones in a sequence for each successive package. The packages can be labeled according to landing zone. The first landing zone can display a "1" and the garage access unit can confirm the package has been placed before displaying "2" at the second landing zone and so forth.

The invention has been described with reference to various specific and preferred embodiments and techniques. Nevertheless, it is understood that many variations and modifications may be made while remaining within the spirit and scope of the invention.

What is claimed is:

1. A garage access unit, comprising:
   a housing mounted to a wall of a house;
   a camera mounted to the housing and being directed toward a zone to be monitored by the camera;
   a data storage unit in the housing being configured to store data captured by the camera;
   a processing unit in the housing configured to execute commands to control the camera and the data storage component;
   a wireless communication module configured to communicate with a remote device and to communicate with a motor unit coupled to an overhead door of a garage of the house, wherein a button mounted to the housing causes the wireless communication module to instruct the motor unit to raise, lower, or stop the overhead door; and
   a power supply configured to provide electrical power to the garage access unit;
   wherein the commands comprise:
      observing the zone with the camera;
      identifying objects visible in the zone as permanent objects;
      identifying a new object entering the zone that is not a permanent object;
      classifying the new object as one or more of:
         a vehicle;
         a human; or
         an animal;
      if the object is classified as a vehicle, human, or animal, incrementing a count for the vehicle, human, or animal accordingly; and
      if the count for the new object exceeds a predefined limit, or if the new object cannot be classified as a vehicle, a human, or an animal, triggering an alarm.

2. The garage access unit of claim 1 wherein the garage access unit is wirelessly connected to the remote device operable by a user, and wherein the alarm comprises a notification to the remote device.

3. The garage access unit of claim 1 wherein the zone comprises an opening to the garage that is covered by an overhead door when the overhead door is closed.

4. The garage access unit of claim 1 wherein the zone comprises the inside of the garage.

5. The garage access unit of claim 1 wherein the camera comprises a first camera mounted outside of the garage, the garage access unit further comprising a second camera on an inside of the garage.

6. The garage access unit of claim 1 wherein the housing is a first housing, the garage access unit further comprising a second housing and wherein one or more of the camera, data storage unit, processing unit, and power supply is housed within the second housing.

7. The garage access unit of claim 1 wherein the commands further comprise recognizing the new object as one of a predefined entity from among a list of predefined entities.

8. The garage access unit of claim 1 wherein identifying objects visible in the zone as permanent objects comprises:
   displaying an image of the zone to a user on the remote device; and
   receiving input from the user via the remote device to identify features visible in the zone that are permanent.

9. The garage access unit of claim 1, the commands further comprising receiving the predefined limit for the count from a user.

10. The garage access unit of claim 7 wherein the data storage unit is configured to store one or more rules associated with objects in the predefined list.

11. The garage access unit of claim 10 wherein the rules comprise one or more of:
   unlocking the overhead door;
   activating the open button;
   opening the overhead door;
   displaying a message;
   playing an audible sound; and
   sending a message to the remote device.

12. The garage access unit of claim 7 wherein recognizing the new object comprises executing a facial recognition routine.

13. The garage access unit of claim 7 wherein recognizing the new object comprises identifying a license plate number.

14. The garage access unit of claim 7 wherein recognizing the new object comprises exchanging a wireless signal with the new object.

15. A method of identifying objects arriving at a house, the method comprising:
- identifying background objects visible in a field of view of a camera positioned at the house;
- labeling the background objects as permanent objects;
- monitoring the zone for new objects entering the zone;
- classifying the new objects as vehicle, human, or animal;
- if the new object is not classifiable, issuing an alarm to a remote device;
- if the new object is classifiable, incrementing a count for the classification vehicle, human, or animal;
- if the count exceeds a limit, issuing an alarm;
- receiving information for a predefined list of allowed entities containing visual characteristics for the allowed entities; and
- recognizing the new object as an allowed entity.

16. The method of claim 15, further comprising receiving one or more rules associated with one or more of the predefined list of allowed entities and communicating instructions pertaining to the rules to the remote device.

17. The method of claim 15, further comprising receiving from a user an indication of one or more house-specific features in the zone, including one or more of a driveway, a front door, or a walkway, and wherein the count comprises a count for a new object at each house-specific feature.

18. A garage access unit, comprising:
- an inside component mounted to a wall inside a garage near an opening for an overhead door, the inside component comprising:
  - a housing;
  - an inside camera mounted to the housing with a field of view directed toward the opening for the overhead door and including at least a portion of an inside of the garage;
  - an activatable button mounted to the housing, the activatable open button being coupled to a motor unit for the overhead door, wherein pressing the activatable open button causes the motor unit to raise, lower, or stop the overhead door;
- an outside component mounted to a wall outside the garage near the opening for the overhead door, the outside component comprising:
  - an outside camera mounted to the housing with a field of view directed toward the opening for the overhead door and including at least a portion of a driveway leading up to the opening for the overhead door, wherein the field of view of the inside camera and the field of view of the outside camera overlap in the opening for the overhead door;
  - an activatable open button mounted to the housing, the activatable open button being coupled to the motor unit for the overhead door, wherein pressing the activatable open button causes the motor unit to raise, lower, or stop the overhead door; and
- an electronics unit comprising a processing unit, a data storage unit, a battery, and a memory, wherein the electronics unit is in the housing of the inside component, the outside component, or wherein the electronics unit is split between the inside component and the outside component;
- wherein the memory electronics unit is configured to execute commands stored in the memory, the commands comprising:
- storing visually recognizable information for identifying one or more allowed entities;
- from visual images captured by the inside camera or the outside camera, recognizing an object entering a field of view of the inside camera or the outside camera as an allowed entity;
- storing one or more rules associated with the allowed entities, wherein the rules pertain to actions to be performed by the garage access unit; and
- executing one or more of the rules for an allowed entity when the camera identifies the allowed entity entering a field of view of the inside camera or the outside camera.

19. The garage access unit of claim 18 wherein the rules comprise one or more of:
- activating the activable button on the inside component or the outside component;
- instructing the motor unit to raise, lower, or stop the overhead door;
- sending a message to a remote device;
- turning on a light at the house; or
- disabling a security device.

20. The garage access unit of claim 18, the commands further comprising receiving an indication of regions of the zone that pertain to house-specific areas including at least driveway and front door, and wherein one or more of the rules pertains to identifying the allowed entity and a location of the allowed entity relative to the house-specific areas.

* * * * *